(12) United States Patent
Deutsch et al.

(10) Patent No.: US 12,346,664 B1
(45) Date of Patent: Jul. 1, 2025

(54) INTERACTIONS WITH A GENERATIVE RESPONSE ENGINE DURING A LONG RUNNING TASK

(71) Applicant: OpenAI OpCo, LLC., San Francisco, CA (US)

(72) Inventors: Noah Deutsch, San Francisco, CA (US); Benjamin Zweig, San Francisco, CA (US)

(73) Assignee: OpenAI OpCo, LLC., San Francisco, CA (US)

( * ) Notice: Subject to any disclaimer, the term of this patent is extended or adjusted under 35 U.S.C. 154(b) by 0 days.

(21) Appl. No.: 18/734,363

(22) Filed: Jun. 5, 2024

(51) Int. Cl.
*G06F 9/46* (2006.01)
*G06F 9/52* (2006.01)
*G06F 40/35* (2020.01)
*G06F 40/40* (2020.01)

(52) U.S. Cl.
CPC ............... *G06F 40/35* (2020.01); *G06F 9/52* (2013.01); *G06F 40/40* (2020.01)

(58) Field of Classification Search
CPC ...................................................... G06F 9/52
See application file for complete search history.

(56) References Cited

U.S. PATENT DOCUMENTS

| | | | |
|---|---|---|---|
| 2014/0109100 A1* | 4/2014 | Kurihara | G06F 9/4881 718/102 |
| 2018/0191860 A1* | 7/2018 | Ghafourifar | H04L 67/60 |
| 2021/0081819 A1* | 3/2021 | Polleri | G06N 5/022 |
| 2021/0279424 A1* | 9/2021 | Galitsky | G06F 16/242 |
| 2022/0374956 A1* | 11/2022 | Jungmeisteris | G06F 3/0482 |

* cited by examiner

*Primary Examiner* — Gregory A Kessler
(74) *Attorney, Agent, or Firm* — Polsinelli PC

(57) ABSTRACT

The present technology provides an interaction paradigm whereby a prompt source can continue to interact with the generative response engine through a conversational interface while the generative response engine is processing a task, especially a long-running task. A prompt source can provide additional prompts to modify or clarify the task. The prompt source can also provide additional tasks or subtasks. The generative response engine can also provide intermediate responses in the conversational interface. For example, the generative response engine can respond to prompts provided by the prompt source during the performance of the long-running task. The generative response engine can also determine that it should ask for additional details or clarification, and in response to such a determination, the generative response engine can provide intermediate responses in the conversation interface to encourage further input from the prompt source.

18 Claims, 11 Drawing Sheets

502

Creating a business plan is a systematic process that involves several key steps, some of which are prerequisites for others. Here's a structured approach to building your business plan, with the sequence and dependencies clearly outlined:

1. Define Your Business Idea

Task: Clarify what your business will offer in terms of products or services.
Prerequisite: This is the foundational step; everything in your business plan will build on this idea.

2. Conduct Market Research

Task: Research your target market, competitors, and industry trends to validate your business idea.
Prerequisite: Must have a defined business idea (Step 1).

3. Identify Your Target Audience

Task: Specify who your customers are, including demographics, behaviors, and needs.
Prerequisite: Requires information gathered from market research (Step 2).

4. Outline Your Business Structure

Task: Decide on the legal structure of your business (e.g., sole proprietorship, partnership, corporation).
Prerequisite: Generally independent but benefits from insights gained in previous steps.

5. Develop Your Product or Service

Task: Detail the specifics of what you're selling, including development, production, and sourcing.
Prerequisite: Requires a clear understanding of the market and customer needs (Steps 2 and 3).

6. Plan Your Marketing Strategy

Task: Create a strategy for how you will reach your target audience and differentiate from competitors.
Prerequisite: Must understand target audience and competitors (Steps 2 and 3).

FIG. 5A

7. Organize Your Operations Plan

Task: Outline how your business will operate on a daily basis, including logistics, suppliers, and management.
Prerequisite: Should have a clear product/service plan (Step 5) and marketing strategy (Step 6).

8. Prepare Financial Projections

Task: Develop financial projections including startup costs, operating costs, revenue forecasts, and breakeven analysis.
Prerequisite: Needs comprehensive information from almost all previous steps, particularly product/service development and operations planning (Steps 5 and 7).

9. Write the Executive Summary

Task: Summarize the key aspects of your business plan, including your mission statement, product/service, and basic financial information.
Prerequisite: This should be written last as it summarizes the entire business plan.

10. Review and Revise

Task: Go through the entire plan to make adjustments and refine details for coherence and effectiveness.
Prerequisite: Requires a completed draft of all previous sections.

Sequence of Execution

- Start with steps 1 and 4: These can be initiated simultaneously as they lay the foundational framework.
- Proceed with steps 2 and 3: These are critical early tasks because they influence most subsequent decisions.
- Follow with steps 5, 6, and 7: These operational details are dependent on understanding the market and customer.
- Complete step 8: Financials depend on details from nearly all previous steps.
- Finish with steps 9 and 10: These are best completed last as they depend on the entirety of the document. 

FIG. 5B

INTERACTIONS WITH A GENERATIVE RESPONSE ENGINE DURING A LONG RUNNING TASK

BACKGROUND

Generative response engines often provide a conversational interface wherein a user can provide a prompt (usually text in natural language, which can optionally be combined with one or more images or files) to the generative response engine, and the generative response engine provides a response (also generally in natural language, which can optionally be combined with images, code, applications, etc. that are responsive to the prompt). However, a notable limitation of current implementations is the inability of users to interact with such systems while they are engaged in processing a task. Once a user sends an input to a generative response engine, the system must complete its entire processing cycle before any further interaction can occur.

BRIEF DESCRIPTION OF THE SEVERAL VIEWS OF THE DRAWINGS

Details of one or more embodiments of the subject matter described in this disclosure are set forth in the accompanying drawings and the description below. However, the accompanying drawings illustrate only some typical embodiments of this disclosure and are therefore not to be considered limiting of its scope. Other features, embodiments, and advantages will become apparent from the description, the drawings and the claims.

FIG. 5A and FIG. 5B illustrates an example output by the generative response engine identifying a sequence of tasks for building a business plan in accordance with some embodiments of the present technology.

DETAILED DESCRIPTION

Figure 1:
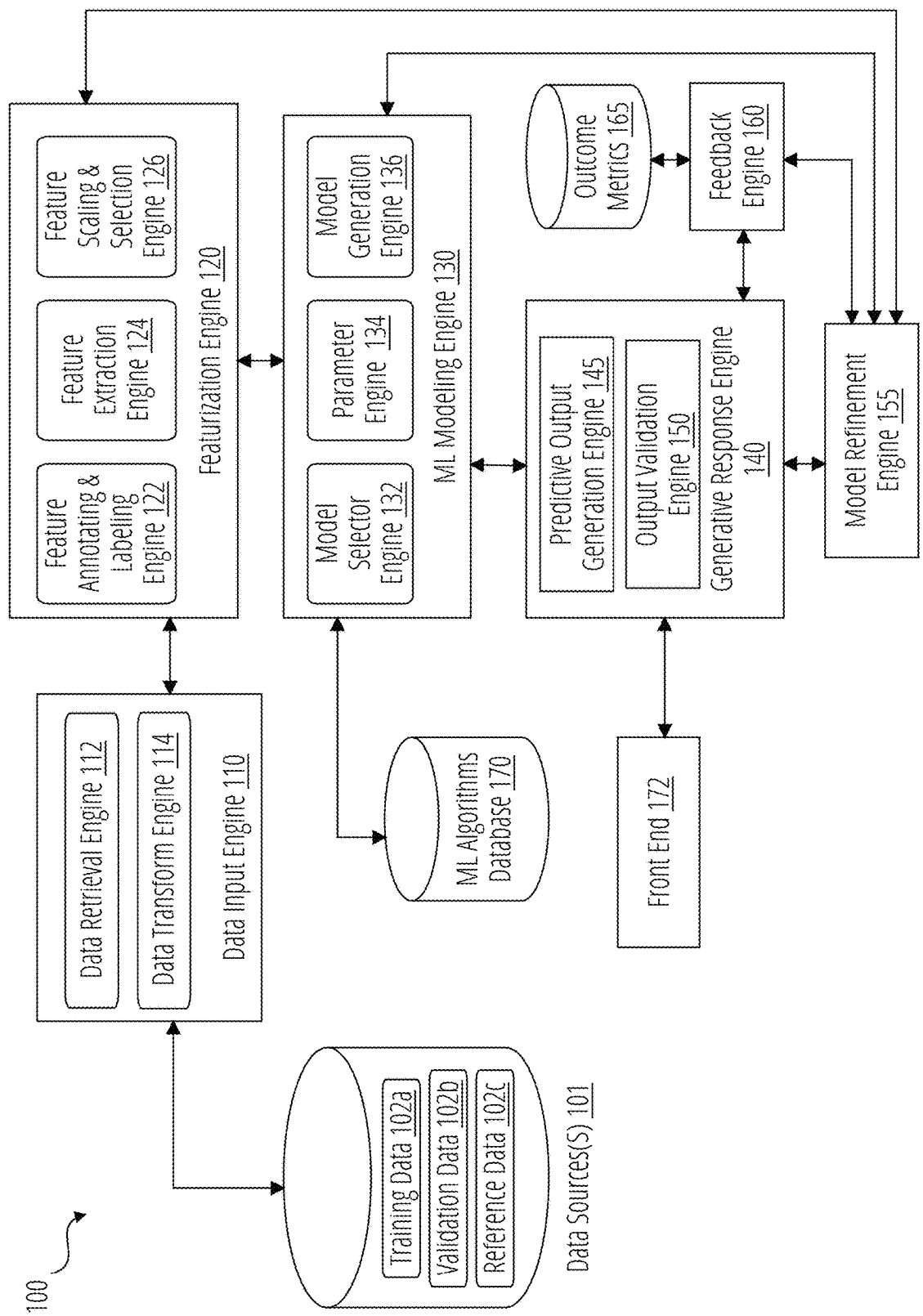
FIG. 1 is a block diagram illustrating an exemplary machine learning platform for implementing various aspects of this disclosure in accordance with some embodiments of the present technology.

Generative response engines often provide a conversational interface wherein a user can provide a prompt (usually text in natural language, which can optionally be combined with one or more images or files) to the generative response engine, and the generative response engine provides a response (also generally in natural language, which can optionally be combined with images, code, applications, etc. that are responsive to the prompt). However, a notable limitation of current implementations is the inability of users to interact with such systems while they are engaged in processing a task. Once a user sends an input to a generative response engine, the system must complete its processing cycle before any further interaction can occur. This sequential processing model results in periods during which the user is effectively waiting without feedback, unable to provide additional input, clarify previous statements, or cancel the ongoing task. This limitation not only affects the user's experience by introducing delays but also restricts the interactive potential of these systems to dynamically adapt to new inputs or corrections during task execution. Addressing this limitation could significantly enhance the usability and flexibility of generative response engines using conversational interfaces, making them more responsive and adaptable to user needs in real-time.

This limitation of generative response engines using conversational interfaces will become more problematic as users provide more complex tasks to generative response engines. For example, the current interaction paradigm provides an acceptable or tolerable user experience when the generative response engine requires a short period of time measured in seconds or single-digit minutes but will not be acceptable when tasks are measured in tens of minutes, hours, or even days. For example, the current interaction paradigm will not provide an acceptable user experience if the generative response engine returns an incorrect response after a day of processing.

The present technology addresses these challenges by providing an interaction paradigm whereby a user can continue to interact with the generative response engine through the conversational interface while the model is processing a task, especially a long-running task. As will be addressed further herein, a user can monitor the progress of the generative response engine in the performance of a task. This can include requesting a status update from the generative response engine as well as the generative response engine proactively providing a status indicator. The user can also provide additional prompts to modify or clarify the task. The user can also provide additional tasks or subtasks.

The generative response engine can also provide intermediate responses to the user in the conversational interface. For example, the generative response engine can respond to prompts provided by the user during the performance of the long-running task. The generative response engine can also determine that it should ask the user for additional details or clarification, and in response to such a determination, the generative response engine can provide intermediate responses in the conversational interface to encourage further input from the user.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

FIG. 1 is a block diagram illustrating an example machine learning platform for implementing various aspects of this disclosure in accordance with some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, and some components can be divided into separate components.

System 100 may include data input engine 110 that can further include data retrieval engine 112 and data transform engine 114. Data retrieval engine 112 may be configured to access, interpret, request, or receive data, which may be adjusted, reformatted, or changed (e.g., to be interpretable by another engine, such as data input engine 110). For example, data retrieval engine 112 may request data from a remote source using an API. Data input engine 110 may be configured to access, interpret, request, format, re-format, or receive input data from data sources(s) 101. For example, data input engine 110 may be configured to use data transform engine 114 to execute a re-configuration or other change to data, such as a data dimension reduction. In some embodiments, data sources(s) 101 may be associated with a single entity (e.g., organization) or with multiple entities. Data sources(s) 101 may include one or more of training data 102a (e.g., input data to feed a machine learning model as part of one or more training processes), validation data 102b (e.g., data against which at least one processor may compare model output with, such as to determine model output quality), and/or reference data 102c. In some embodiments, data input engine 110 can be implemented using at least one computing device. For example, data from data sources(s) 101 can be obtained through one or more I/O devices and/or network interfaces. Further, the data may be stored (e.g., during execution of one or more operations) in a suitable storage or system memory. Data input engine 110 may also be configured to interact with a data storage, which may be implemented on a computing device that stores data in storage or system memory.

System 100 may include featurization engine 120. Featurization engine 120 may include feature annotating & labeling engine 122 (e.g., configured to annotate or label features from a model or data, which may be extracted by feature extraction engine 124), feature extraction engine 124 (e.g., configured to extract one or more features from a model or data), and/or feature scaling & selection engine 126 Feature scaling & selection engine 126 may be configured to determine, select, limit, constrain, concatenate, or define features (e.g., AI features) for use with AI models.

System 100 may also include machine learning (ML) ML modeling engine 130, which may be configured to execute one or more operations on a machine learning model (e.g., model training, model re-configuration, model validation, model testing), such as those described in the processes described herein. For example, ML modeling engine 130 may execute an operation to train a machine learning model, such as adding, removing, or modifying a model parameter. Training of a machine learning model may be supervised, semi-supervised, or unsupervised. In some embodiments, training of a machine learning model may include multiple epochs, or passes of data (e.g., training data 102a) through a machine learning model process (e.g., a training process). In some embodiments, different epochs may have different degrees of supervision (e.g., supervised, semi-supervised, or unsupervised). Data into a model to train the model may include input data (e.g., as described above) and/or data previously output from a model (e.g., forming a recursive learning feedback). A model parameter may include one or more of a seed value, a model node, a model layer, an algorithm, a function, a model connection (e.g., between other model parameters or between models), a model constraint, or any other digital component influencing the output of a model. A model connection may include or represent a relationship between model parameters and/or models, which may be dependent or interdependent, hierarchical, and/or static or dynamic. The combination and configuration of the model parameters and relationships between model parameters discussed herein are cognitively infeasible for the human mind to maintain or use. Without limiting the disclosed embodiments in any way, a machine learning model may include millions, billions, or even trillions of model parameters. ML modeling engine 130 may include model selector engine 132 (e.g., configured to select a model from among a plurality of models, such as based on input data), parameter engine 134 (e.g., configured to add, remove, and/or change one or more parameters of a model), and/or model generation engine 136 (e.g., configured to generate one or more machine learning models, such as according to model input data, model output data, comparison data, and/or validation data).

In some embodiments, model selector engine 132 may be configured to receive input and/or transmit output to ML algorithms database 170. Similarly, featurization engine 120 can utilize storage or system memory for storing data and can utilize one or more I/O devices or network interfaces for transmitting or receiving data. ML algorithms database 170 may store one or more machine learning models, any of which may be fully trained, partially trained, or untrained. A machine learning model may be or include, without limitation, one or more of (e.g., such as in the case of a meta-model) a statistical model, an algorithm, a neural network (NN), a convolutional neural network (CNN), a generative neural network (GNN), a Word2Vec model, a bag of words model, a term frequency-inverse document frequency (tf-idf) model, a GPT (Generative Pre-trained Transformer) model (or other autoregressive model), a Proximal Policy Optimization (PPO) model, a nearest neighbor model (e.g., k nearest neighbor model), a linear regression model, a k-means clustering model, a Q-Learning model, a Temporal Difference (TD) model, a Deep Adversarial Network model, or any other type of model described further herein. Two specific examples of machine learning models that can be stored in the ML algorithms database 170 include versions DALL E and CHAT GPT, both provided by OPEN AI.

System 100 can further include generative response engine 140 that is made up of a predictive output generation engine 145, output validation engine 150 (e.g., configured to apply validation data to machine learning model output). Predictive output generation engine 145 can be configured to receive inputs from front end 172 that provide some guidance as to a desired output. Front end 172 can be a graphical user interface where a user can provide natural language prompts and receive responses from generative response engine 140. Front end 172 can also be an application programming interface (API) which other applications can call by providing a prompt and can receive responses from generative response engine 140. Predictive output generation engine 145 can analyze the input and identify relevant patterns and associations in the data it has learned to generate a sequence of words that predictive output generation engine 145 predicts is the most likely continuation of the input using one or more models from the ML algorithms database 170, aiming to provide a coherent and contextually relevant answer. Predictive output generation engine 145 generates responses by sampling from the probability distribution of possible words and sequences, guided by the patterns observed during its training. In some embodiments, predictive output generation engine 145 can generate multiple possible responses before presenting the final one. Predictive output generation engine 145 can generate multiple responses based on the input, and these responses are variations that predictive output generation engine 145 considers potentially relevant and coherent. Output validation engine 150 can evaluate these generated responses based on certain criteria. These criteria can include relevance to the prompt, coherence, fluency, and sometimes adherence to specific guidelines or rules, depending on the application. Based on this evaluation, output validation engine 150 selects the most appropriate response. This selection is typically the one that scores highest on the set criteria, balancing factors like relevance, informativeness, and coherence.

System 100 can further include feedback engine 160 (e.g., configured to apply feedback from a user and/or machine to a model) and model refinement engine 155 (e.g., configured to update or re-configure a model). In some embodiments, feedback engine 160 may receive input and/or transmit output (e.g., output from a trained, partially trained, or untrained model) to outcome metrics database 165. Outcome metrics database 165 may be configured to store output from one or more models and may also be configured to associate output with one or more models. In some embodiments, outcome metrics database 165, or other device (e.g., model refinement engine 155 or feedback engine 160), may be configured to correlate output, detect trends in output data, and/or infer a change to input or model parameters to cause a particular model output or type of model output. In some embodiments, model refinement engine 155 may receive output from predictive output generation engine 145 or output validation engine 150. In some embodiments, model refinement engine 155 may transmit the received output to featurization engine 120 or ML modeling engine 130 in one or more iterative cycles.

The engines of system 100 may be packaged functional hardware units designed for use with other components or a part of a program that performs a particular function (e.g., of related functions). Any or each of these modules may be implemented using a computing device. In some embodiments, the functionality of system 100 may be split across multiple computing devices to allow for distributed processing of the data, which may improve output speed and reduce computational load on individual devices. In some embodiments, system 100 may use load-balancing to maintain stable resource load (e.g., processing load, memory load, or bandwidth load) across multiple computing devices and to reduce the risk of a computing device or connection becoming overloaded. In these or other embodiments, the different components may communicate over one or more I/O devices and/or network interfaces.

System 100 can be related to different domains or fields of use. Descriptions of embodiments related to specific domains, such as natural language processing or language modeling, is not intended to limit the disclosed embodiments to those specific domains, and embodiments consistent with the present disclosure can apply to any domain that utilizes predictive modeling based on available data.

Figure 2A:
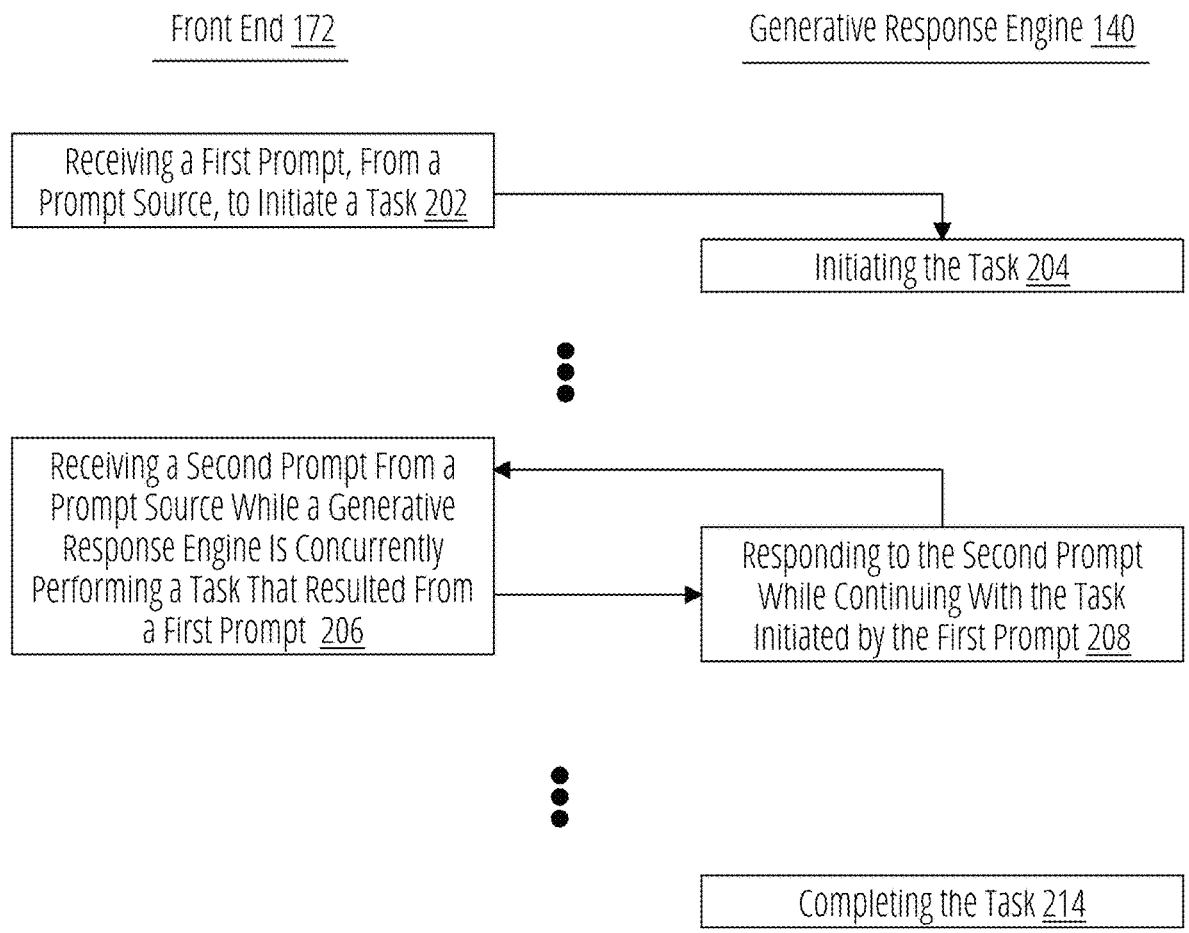
FIG. 2A illustrates example interactions with a generative response engine during a long-running task in accordance with some embodiments of the present technology.

FIG. 2A illustrates example interactions with a generative response engine during a long-running task in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

As introduced above, the present technology introduces an interaction paradigm with generative response engine 140 by which users can interact with generative response engine 140 by providing conversational inputs into front end 172 while generative response engine 140 is performing a task. Front end 172 can be a graphical user interface where a user can provide natural language prompts and receive responses from generative response engine 140. Front end 172 can also be an application programming interface (API) which other applications can call by providing a prompt and can receive responses from generative response engine 140.

According to some examples, the method includes receiving a first prompt, from a prompt source, to initiate a task at block 202. For example, front end 172 illustrated in FIG. 1 may receive a first prompt to initiate the task. The task can be any task, though the present technology is especially useful for long-running tasks or complex tasks. A long-running task is any task that the period in which it takes for generative response engine 140 to provide a reply is long enough that the prompt source or generative response engine 140 might desire to further interaction in front end 172 before a response to the first prompt is delivered to the prompt source in front end 172. A complex task is any task that can be broken into two or more tasks. Thus, a long-running task may be a single step task or a multiple step task.

The prompt source can be any entity such as a user, application, device, artificial intelligence bot (such as an instance of generative response engine).

According to some examples, the method includes initiating the task at block 204. For example, the generative response engine 140 illustrated in FIG. 1 may initiate the task. Generative response engine 140 can initiate the task as it would any other task, but in the context of the present technology, a dialogue between the prompt source and generative response engine 140 can develop in front end 172 while the task is processing as addressed with respect to block 206.

Figure 3:
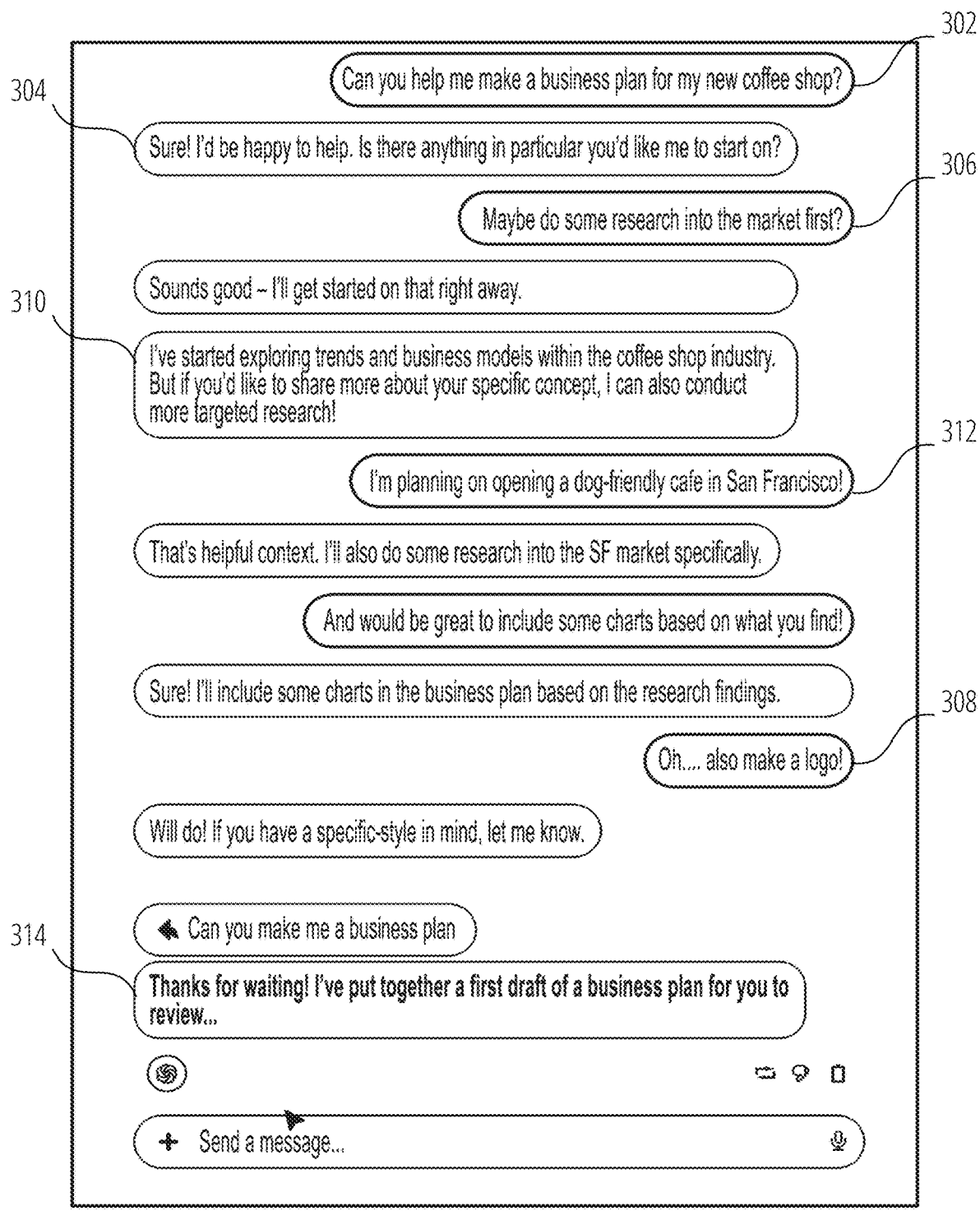
FIG. 3 illustrates an example dialog between a prompt source and the generative response engine in accordance with some embodiments of the present technology.

For example, FIG. 3 illustrates an example dialog between a prompt source and generative response engine 140.

According to some examples, the method includes receiving a second prompt from the prompt source while the generative response engine is concurrently processing a task that resulted from the first prompt at block 206. For example, front end 172 illustrated in FIG. 1 may receive the second prompt directed to generative response engine 140 while the generative response engine is concurrently performing the task.

The second prompt can be provided at any time while the generative response engine is concurrently processing a task (whether the task results from the first prompt or another prompt). Furthermore, while the present description and claims refer to a second prompt, this is only to distinguish the second prompt from the first prompt that initiates the task. There can be any number of second prompts, and a second prompt is not limited to a second ordinal prompt.

The second prompt can pertain to the task that is concurrently being performed; define a subtask associated with the task that is concurrently being performed; revise the task that is concurrently being performed; request an estimate of an amount of time to complete the task; specify a priority associated with the task or a subtask; and/or initiate an unrelated task in a different thread, etc. Examples of some of these second prompts are illustrated in FIG. 3 below.

According to some examples, the method includes responding to the second prompt while continuing with the task initiated by the first prompt at block 208. For example, the generative response engine 140 illustrated in FIG. 1 may respond to the second prompt while continuing with the task initiated by the first prompt.

As illustrated in FIG. 2A, there can be any number of cycles receiving a second prompt at block 206 and responding to the second prompt at block 208 while generative response engine 140 continues with the task initiated by the first prompt.

Eventually, according to some examples, the method includes completing the task at block 214. For example, the generative response engine 140 illustrated in FIG. 1 may complete the task initiated by the first prompt and include any subtasks or revisions to the task that resulted from the second prompt.

Figure 2B:
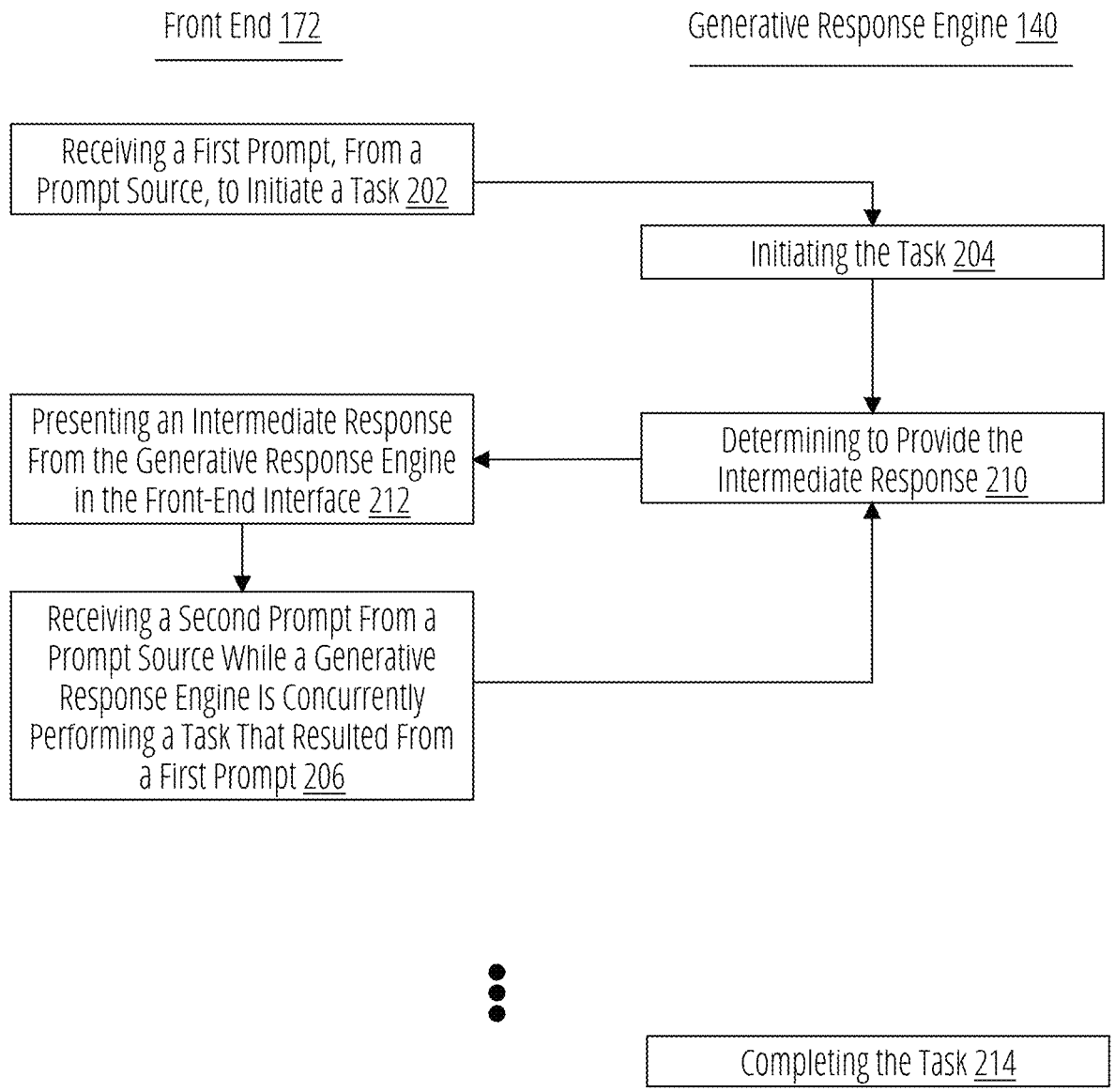
FIG. 2B illustrates a variation of the method illustrated in FIG. 2A, where the generative response engine provides an intermediate response prior to completing the task in accordance with some embodiments of the present technology.

FIG. 2B illustrates a variation of the method illustrated in FIG. 2A, where the generative response engine initiates dialog prior to completing the task by providing an intermediate response in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Just as illustrated in FIG. 2A, the method includes receiving a first prompt to initiate a task at block 202 and initiating the task at block 204.

According to some examples, the method includes determining to provide the intermediate response at block 210. For example, the generative response engine 140 illustrated in FIG. 1 may determine to provide the intermediate response.

There can be several instances in which a generative response engine might determine to provide an intermediate response. Some first prompts or second prompts might be ambiguous. In such instances, generative response engine 140 can be trained to identify prompts that are ambiguous and provide an intermediate response that attempts to resolve the ambiguity. Some of these ambiguities might be considered blocking ambiguities such that a task cannot be performed without resolving the ambiguity.

Generative response engine 140 can also be trained to discover that a first prompt or second prompt is ambiguous when attempting to respond to the first prompt. In such instances, the generative response engine 140 might not recognize the first prompt or second prompt as ambiguous until attempting to generate the response. This might occur when generative response engine 140 determines that it can compose multiple responses that might appear to be an acceptable response to the given prompt.

In some embodiments, ambiguity can be considered blocking or non-blocking. A blocking ambiguity is one in which generative response engine 140 cannot prepare a satisfactory response without resolving the ambiguity. A non-blocking ambiguity is one in which generative response engine 140 can prepare an acceptable response while working with or around the ambiguity.

An example of a blocking ambiguity might be found with respect to a prompt: "Can you find me a good hotel near my airport in New York?" Since there are multiple airports in New York City and New York State, generative response engine 140 needs to learn which airport to which the prompt refers. Note, that while in this example, generative response engine 140 would provide an intermediate response to ask the prompt source to resolve the ambiguity, generative response engine 140 could also spawn a sub-task to look up your flight information if generative response engine 140 has access to such information. Accordingly, this example and other examples are meant to illustrate the present technology and should not be considered a limitation on any ability of generative response engine 140.

An example of a non-blocking ambiguity might be found with respect to a prompt: "Can you find me a good hotel near JFK airport?" The word good is a relative quality indicator that isn't precisely defined. While generative response engine 140 could provide an intermediate response to resolve the ambiguity, generative response engine 140 could easily provide an example 3-star, 4-star, and 5-star hotel near JFK. This would not result in undue processing time to provide additional options, and the prompt source is likely to be satisfied with the response.

In some embodiments, the same ambiguity that would be considered non-blocking in one prompt might be considered blocking in another prompt. Using the example of the quality indicator, 'good' again, the following prompt might prompt might be considered blocking: "Can you book a vacation package at a good resort in Puerto Rico?" In this instance, resolving the quality of the resort might be considered blocking because a failure to resolve the ambiguity would result in an increasing tree of tasks that would waste significant computational time and potentially commit the prompt source to multiple reservations. More specifically, it is possible for generative response engine 140 to identify resorts of multiple quality standards, but then it would further need to identify vacation packages and then book them at every resort that is a candidate. This would not provide an acceptable result to the prompt source or the infrastructure providing the processing resources for generative response engine 140.

Generative response engine 140 can receive training via reinforcement learning to identify when to provide an intermediate response (blocking ambiguity and non-blocking ambiguity) and when to continue processing a response to the first prompt.

As introduced above, generative response engine 140 might not be able to recognize that an intermediate response would be beneficial from the first prompt or second prompt. In some embodiments, generative response engine 140 may determine that an intermediate response should be provided as it is processing a response to a first prompt or second prompt.

Generative response engine 140 can be configured to identify decision boundaries. Generative response engine 140 can be trained learn to identify such decision boundaries through reinforcement learning, however, conceptually, decision boundaries can occur during generation of a response, after generation of a response at a quality evaluation stage, or after an interval. The examples regarding blocking and non-blocking ambiguity of a prompt are one example of recognizing and acting on a decision boundary. Another example could occur while handling a complex task that might require a chain of tasks (addressed further with respect to FIG. 7). One or more initial tasks might not provoke an intermediate response, but eventually generative response engine 140 might identify a task in the chain of tasks that would benefit from providing an intermediate response to the prompt source. Another example could occur while handling a task that turns out to be more difficult than predicted (addressed with respect to FIG. 4). Generative response engine 140 might determine that an intermediate response should be provided when generative response engine 140 has made less progress than predicted within an interval. Generative response engine 140 can provide an intermediate response when it is expected to aid generative response engine 140 in completing the task or sub-task. Additionally, generative response engine 140 might determine that an intermediate response should be provided when, after generating a response to the first prompt or second prompt, output validation engine 150 of generative response engine 140 determines that one or more candidate responses generated by generative response engine 140 are not of sufficient quality. All of these are non-limiting, conceptual examples of possible decision boundaries, though actual decision boundaries do not need to conform to these examples or any easily explainable condition.

According to some examples, the method includes presenting an intermediate response from the generative response engine in the front-end interface at block 212. For example, the front end 172 illustrated in FIG. 1 may present the intermediate response from the generative response engine.

Just as illustrated in FIG. 2A, the method includes receiving a second prompt from a prompt source with the generative response engine through a front-end interface while a generative response engine is concurrently performing a task that resulted from a first prompt received in the front-end interface at block 206.

As illustrated in FIG. 2B there can be any number of cycles providing an intermediate response at block 210 and block 212) and receiving a second prompt at block 206 while generative response engine 140 continues with the task initiated by the first prompt. Additionally, the cycle of receiving a second prompt at block 206 and responding to the second prompt at block 208, as illustrated in FIG. 2A, can be mixed in with the interactions addressed with respect to FIG. 2B such that the prompt source and generative response engine 140 can engage in a dialog that includes generative response engine 140 seeking clarifications and the prompt source requesting status updates, modifying the task, or adding additional tasks.

While the examples given have predominantly addressed instances in which generative response engine 140 provides intermediate responses to collect additional information from the prompt source, intermediate responses can also be provided to give information to the prompt source. For example, intermediate responses can also include completed portions of a task, while generative response engine 140 continues with other portions of a larger task.

The intermediate response is not limited to requesting further input from the prompt source. The intermediate response can also provide parts of the requested output or provide answers in response to second prompts. An intermediate response is any response or question provided while the task initiated in response to the first prompt is concurrently being performed.

While several examples refer to generative response engine 140 concurrently performing a task that resulted from the first prompt, it will be appreciated by those of skill in the art that generative response engine 140 does not need to be actively processing the task at all times. Rather, concurrently performing a task refers to a task that was prompted by a first prompt or a second prompt that has not yet been completed. As addressed herein, some tasks will include decision boundaries pertaining to blocking ambiguities or other task dependencies (addressed further below) that might result in periods wherein no active processing is occurring on the task. It is also possible that the same tasks will be subject to resource scheduling constraints wherein no active processing will occur until resources are scheduled and/or instantiated for processing related to the task. Accordingly, a task should be considered to be concurrently processing as long as the task is not yet complete, and a concurrently processing task does not require active processing at all times.

FIG. 3 illustrates an example dialog between a prompt source and the generative response engine in accordance with some embodiments of the present technology.

As illustrated in FIG. 3, a prompt source provides first prompt 302 requesting help in making a business plan for a new coffee shop. First prompt 302 initiates a long-running task.

Generative response engine 140 can determine that there is too much ambiguity to effectively respond to first prompt 302 and can trigger a decision boundary to provide intermediate response 304. Intermediate response 304 requests direction in breaking down the long-running task to identify a starting point for the project.

At the moment that intermediate response 304 is provided, the generative response engine 140 might or might not be actively working on materials for responding to first prompt 302.

FIG. 3 also illustrates another intermediate response 310. Intermediate response 310 pertains to a decision boundary that reflects that the project may be too expansive in scope, and more context would result in more efficient processing and better output. The prompt source responds in second prompt 312, providing additional detail.

FIG. 3 also illustrates an example second prompt 308 wherein the prompt source introduces a sub-task. In this case, the prompt source requests that generative response engine 140 create a logo to accompany the business plan.

The dialog in FIG. 3 can result in the completion of the long-running task with response 314.

Figure 4:
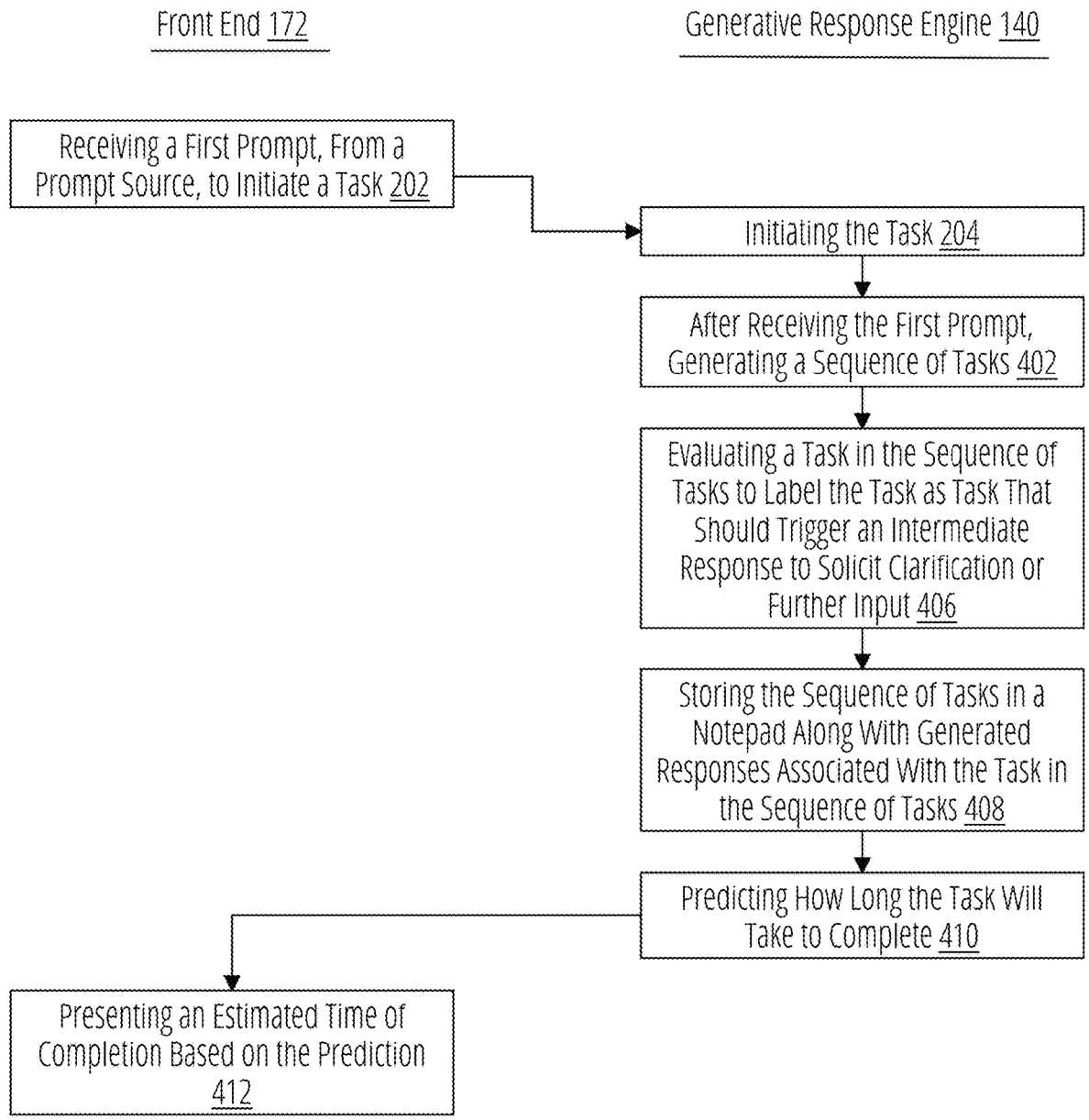
FIG. 4 illustrates an example routine for planning a long-running task in accordance with some embodiments of the present technology.

FIG. 4 illustrates an example routine for planning a long-running task in accordance with some embodiments of the present technology. Although the example routine depicts a particular sequence of operations, the sequence may be altered without departing from the scope of the present disclosure. For example, some of the operations depicted may be performed in parallel or in a different sequence that does not materially affect the function of the routine. In other examples, different components of an example device or system that implements the routine may perform functions at substantially the same time or in a specific sequence.

Some of the tasks that will benefit most from the present technology might be long-running tasks or complex tasks. Unfortunately, generative response engine 140 may operate under certain constraints that affect its performance on large or extended tasks. One key limitation is what's often described as attention decay or the model's diminishing ability to maintain coherence and context continuity over long inputs or extended dialogue exchanges. Sometimes older parts of the text or conversation are forgotten, which can lead to loss of context or relevance in the generated outputs.

Breaking a big task into smaller, more manageable tasks aligns better with the operational strengths of generative response engine 140. This approach allows the model to focus on a specific, constrained context, improving the relevance and coherence of each output. This strategy not only mitigates the effects of attention decay but also leverages the model's capabilities more efficiently, leading to better overall results in complex or lengthy tasks.

Just as illustrated in FIG. 2A, the method includes receiving a first prompt to initiate a task at block 202 and initiating the task at block 204.

According to some examples, the method includes generating a sequence of tasks at block 402. For example, the generative response engine 140 illustrated in FIG. 1 may generate a sequence of tasks based on the first prompt. In some embodiments, the generative response engine is trained to generate the sequence of tasks through a fine-tuning process using reinforcement learning.

In addition to generating the sequence of tasks, generative response engine 140 can identify respective tasks in the sequence of tasks as a blocking task or a non-blocking task. For example, generative response engine 140 can determine dependencies in the sequence of tasks such that some of the respective tasks must be performed in a sequence, whereas other respective tasks can be performed in parallel or can be rearranged in the sequence of tasks. Therefore, generative response engine 140 may determine that some questions are blocking questions (ambiguous questions that require answering to perform any task) or blocking tasks (tasks that block the performance of one or more other tasks).

In some embodiments, the determination of a respective task as blocking or non-blocking can be used in the determination of whether generative response engine 140 should provide an intermediate response and when the intermediate response should be provided. For example, when a task is blocking and it is associated with a blocking ambiguity, an intermediate response needs to be provided to move forward with other tasks in the sequence of tasks.

According to some examples, the method includes evaluating a task in the sequence of tasks to label the task as task that should trigger an intermediate response to solicit clarification or further input at block 406. For example, the generative response engine 140 illustrated in FIG. 1 may evaluate tasks in the sequence of tasks to label the tasks that should trigger an intermediate response to solicit clarification or further input. The determination of whether to provide an intermediate response is addressed in more detail with respect to FIG. 2B.

In some embodiments, the determination to provide an intermediate response can be made at the time the sequence of tasks is created and recorded with the sequence of tasks to trigger the intermediate response when the respective task is processed. In some embodiments, the determination to provide an intermediate response occurs at decision boundaries that occur when a respective task is being processed.

Generative response engine 140 can evaluate the sequence of tasks and whether an intermediate response should be provided during the execution of the task in the sequence of tasks. Accordingly, even if a sequence of tasks was previously established upon initial consideration of the prompt, the sequence of tasks can change as generative response engine 140 performs tasks in the sequence of tasks. Additionally, determinations of whether to provide an intermediate response can be revised as generative response engine 140 processes tasks in the sequence of tasks.

According to some examples, the method includes storing the sequence of tasks in a notepad along with generated responses associated with the task in the sequence of tasks at block 408. For example, the generative response engine 140 illustrated in FIG. 1 may store the sequence of tasks in a notepad along with generated responses associated with the task in the sequence of tasks. In some embodiments, the sequence of tasks is represented in a tree structure or program code that is efficient for generative response engine 140 to utilize to guide its performance of the long-running task. In some embodiments, program code or pseudo-code can be effective since it not only conveys a sequence of dependent tasks but also allows for reference to data stored that was created by earlier performed respective tasks; this format also more easily conveys recursive steps.

The notepad can be any memory structure for use while performing the long-running task.

Another aspect of a long-running task is that a prompt source may want to know the progress of generative response engine 140 towards completing the task. Whether generative response engine 140 presents an estimated time of completion in front end 172 or is responsive to second prompts requesting information on the progress of the long-running task, generative response engine 140 should be able to provide this information.

According to some examples, the method includes predicting how long the task will take to complete at block 410. For example, the generative response engine 140 illustrated in FIG. 1 may predict how long the task will take to complete. In some embodiments, predicting how long the task will take can include predicting how long each task in the sequence of tasks will take and aggregating the predicted time for the remaining tasks in the sequence of tasks.

According to some examples, the method includes presenting an estimated time of completion based on the prediction at block 412. For example, the front end 172 illustrated in FIG. 1 may present an estimated time of completion based on the prediction.

In some embodiments, generative response engine 140 can predict how long a user thinks the task should take. While the task might actually require more time to complete, the prediction of how long a user expects the task should take can be used to cause the generative response engine 140 to provide an intermediate response that updates the user of the progress of the generative response engine around the time the user would expect the task to be complete.

In some embodiments, the first prompt or second prompt can provide an indication of a priority of the task, wherein the generative response engine utilizes the priority to request processing resources and scheduling. The priority of the task can also be useful in determining the estimated time of completion of the task.

FIG. 5A and FIG. 5B illustrates an example output by the generative response engine identifying a sequence of tasks for building a business plan in accordance with some embodiments of the present technology.

FIG. 5A and FIG. 5B illustrates a list of steps 502, with context regarding the objectives of each step and possible dependencies. At the bottom of the list of steps 502, generative response engine 140 has also identified an execution sequence 504 for the steps in list of steps 502. Such a list of steps 502 could be the output of block 402 and stored at block 408.

As addressed herein, several embodiments of the present technology are enabled by training through reinforcement learning. Reinforcement learning is a type of machine learning where an agent learns to make decisions by taking actions in an environment to achieve some goals. The approach is fundamentally based on the concept of reward feedback: the agent is rewarded for actions that lead towards the desired outcome and may be penalized for actions that do not. This learning process involves exploration, where the agent tries out various actions to discover their effects, and exploitation, where the agent uses knowledge acquired from past experiences to make decisions that maximize the cumulative reward. Unlike supervised learning, where models are trained on a dataset with predefined answers, reinforcement learning requires the agent to learn from the consequences of its actions, simulating a process of trial and error. This makes reinforcement learning particularly suited for applications where the correct action is not known beforehand or is highly dynamic, including robotics, game playing, and autonomous vehicle navigation.

Figure 6:
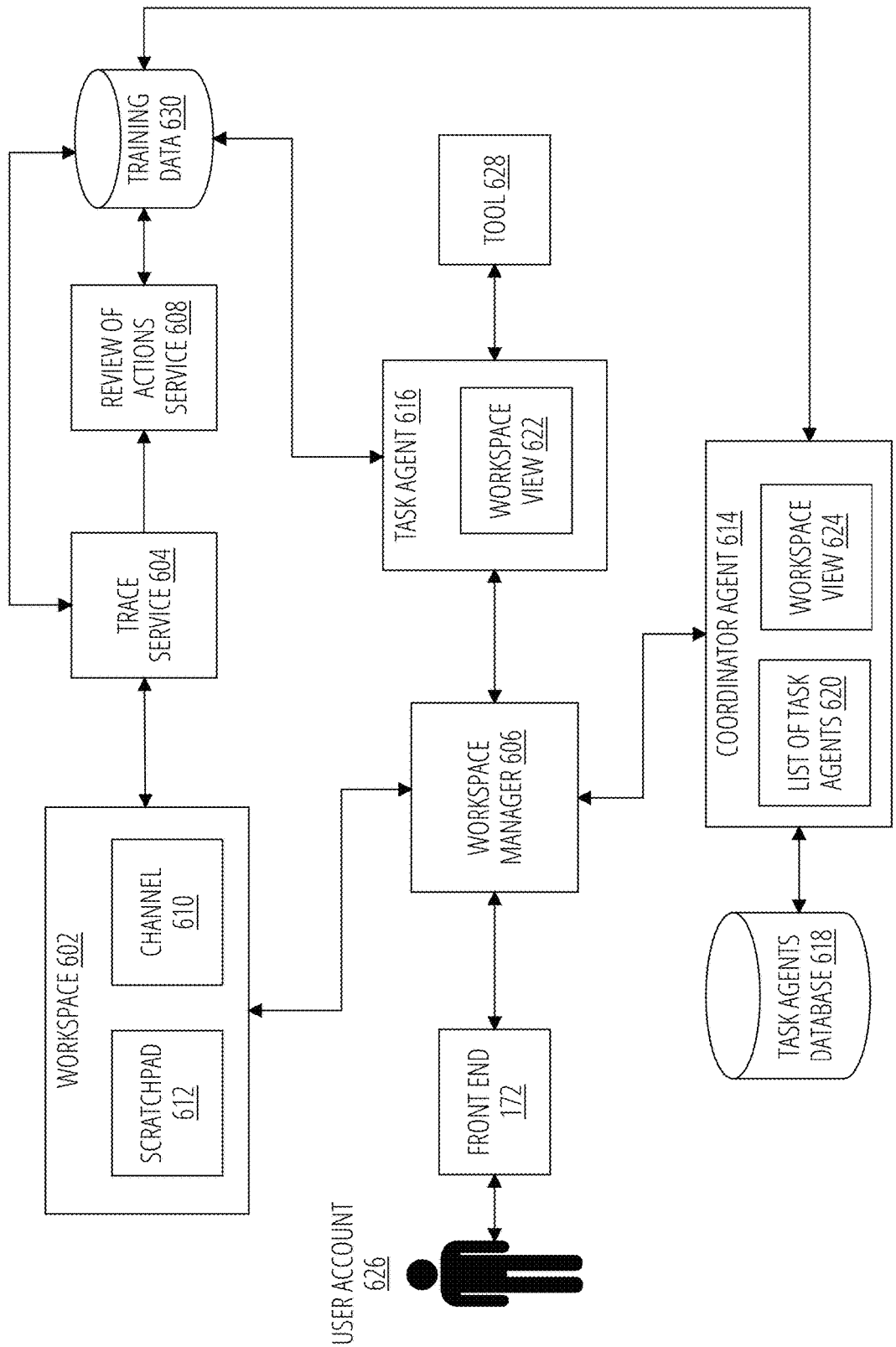
FIG. 6 illustrates an example system for providing a workspace to manage and execute a long running task in accordance with in some embodiments of the present technology.

FIG. 6 illustrates an example system for providing a workspace to manage and execute a long running task in accordance with in some embodiments of the present technology. Although the example system depicts particular system components and an arrangement of such components, this depiction is to facilitate a discussion of the present technology and should not be considered limiting unless specified in the appended claims. For example, some components that are illustrated as separate can be combined with other components, some components can be divided into separate components, some components might not be present or needed, and additional components may be present.

As addressed above, the present technology provides an interaction paradigm whereby a user can continue to interact with the generative response engine through the conversational interface while the model is processing a task, especially a long-running task. The embodiments described above have focused on the interaction between the prompt source and generative response engine, but have referenced that the generative response engine might need to generate and evaluate a plan and execute the plan. FIG. 6 provides a system whereby the generative response engine can invoke other agents to help with the long-running task, and/or can create a scratchpad to record a plan and keep track of intermediary steps along the way to completing the long-running task.

In particular, the present technology provides a common workspace 602, whereby agents (coordinator agent 614 and at least one task agent 616) have access to the workspace 602 and can view the state of workspace 602. Agents can write to the workspace 602, making their messages available to all members of the workspace. Any of the agents can be an instance of generative response engine 140, or they can be an another artificial intelligence tool.

Tying the system of FIG. 1 to the system illustrated in FIG. 6, in most use cases the prompt source is expected to be user account 626 and the generative response engine 140 is expected to be coordinator agent 614, whereby a user might provide a prompt that initiates a long-running task that appears, at least to user account 626, that the long-running task is performed by generative response engine 140. However, it should be appreciated that any agent in FIG. 6 can also be considered a prompt source to another agent. For example coordinator agent 614 can be a prompt source to a task agent 616.

In some ways, workspace 602 is like a file that multiple members of the workspace can access and simultaneously access. The members of the workspace can all monitor and react to their workspace view. This interaction paradigm allows members of the workspace to have autonomy to decide when they should act, as opposed to relying on a central agent to specifically prompt a member of the workspace.

The workspace is a data structure that can record participants in the conversation (including user accounts and autonomous agents), configurations (and updates to configurations) of the autonomous agents, and messages that are grouped into channels. Channels are messaging spaces which might include only a subset of the members in the workspace.

FIG. 6 illustrates three types of members of a workspace-user accounts, a coordinator agent, and task agents.

User account 626 is an example of the user account type of member of a workspace and is a human interacting with workspace 602 as an interface to interact with one or more agents. There can be more than one user account as a member of a workspace, or there might not be any user accounts as a member of the workspace.

The coordinator agent 614 is an autonomous agent that is a general knowledge agent that functions to interact with user account 626. Coordinator agent 614 can interact with user account 626 via a conversational interface, where coordinator agent 614 receives prompts from user account 626 in natural language and coordinator agent 614 provides responses in natural language. One function of coordinator agent 614 is to invoke one or more task agents 616 to join workspace 602 when a prompt from user account 626 is better responded to by an agent with specialized knowledge (e.g., an agent trained on peer-reviewed research) or skills (e.g., an agent trained to do Internet searching). In general, one type of skill might be to interact with a tool 628 over a network. Tool 628 can be any application or service, e.g., tool 628 could be an Internet interface, a database interface, etc.

It should be appreciated that coordinator agent 614 can be any agent. While coordinator agent 614 will generally be addressed as an agent with more general knowledge, the only requirements of a coordinator agent 614 are that it is able to invoke task agents 616 and that it is able to communicate with user account 626. Therefore, an agent that might be a task agent 616 in an embodiment, might be considered a coordinator agent 614 in another embodiment as long as it has the minimum functionality. In some embodiments, coordinator agent 614 might be a personal assistant to user account 626.

In some embodiments, coordinator agent 614 has access to a list of task agents 620, and it can be trained to make decisions on when and which task agent to bring into workspace 602 to help perform a task. If task agents in the list of task agents 620 are not suitable for the task, coordinator agent 614 can be trained to search task agents database 618 to learn of task agents that are appropriate to perform the task. List of task agents 620 can be a list of task agents that have been previously invoked by coordinator agent 614, or that are considered trusted task agents because they are trained by a known party, or are task agents that are likely to be needed often, such as an Internet agent. Task agents database 618 can be a database where any task agent 616 that complies with requirements to be added to task agents database 618 can be included.

The task agents 616 are autonomous agents that are generally trained to perform a specific type of task or that might be trained on a particular knowledge set. Task agents 616 might be smaller (less trainable parameters) and more efficient than a more generalized knowledge model such as coordinator agent 614 such that even if a task agent and the coordinator agent 614 have overlapping knowledge, it might be beneficial to utilize the task agent to perform a task. In some embodiments, the task agent can even be a separate instance of the same artificial intelligence tool making up coordinator agent 614. For example, one instance of an artificial intelligence tool can function as the coordinator agent 614, while another instance of the same artificial intelligence tool can be given system prompts to cause a modified behavior that is appropriate for the task agent. As an example, if user account 626 requests to play a game, such as "rock, paper, scissor", coordinator agent 614 can invoke another instance of itself as the task agent and provide a system prompt instructing the task agent instance that its role is confined to choosing "rock, paper, or scissor" when asked. In this way, two different instances of the same autonomous agent can perform two different roles in workspace 602.

In some embodiments, the system can be used to interact with any task agent 616 that is configured to interact with workspace 602. More particularly, workspace 602 can be associated with a software development kit (SDK) that defines the required information for being included in task agents database 618, and that defines a protocol for acceptable interactions within workspace 602 and that defines application programming interfaces (APIs) and their functions that are available to be called by task agent 616.

For example, in order to be included in task agents database 118, the software development kit can require that a task agent provide at least an API through which workspace view updates can be sent to it and a description of when the task agent should be invoked.

Once invoked into the workspace, a task agent can take any of the following actions: join/leave workspace, create/delete channel, join/leave/invite to channel, send message, spawn/kill/die process, and yield. These actions are subject to any workspace restrictions that might be added to the configuration of a particular workspace instance by user account 626 or coordinator agent 614.

As illustrated in FIG. 6, workspace 602 can include one or more channels 610. The one or more channels 610 are message threads that can include some or all of the members of a workspace 602. Generally, a workspace will include at least a main channel which includes the coordinator agent and the user account, and only the coordinator agent and the user account 626 can post in the main channel. For example, FIG. 3 illustrates an example workspace showing a main channel that includes a user account and coordinator agent. The main channel is part of the user accounts 626 workspace that can be displayed in front end 172.

In some embodiments, the workspace can also include additional channels that can be spawned to allow interactions between a subset of members of the workspace. For example, while the user account might make a request to the coordinator agent, the coordinator agent might invoke a task agent and communicate with the task agent in a channel that includes the coordinator agent and the task agent, but not the user account. This can be helpful for carrying out portions of the long-running task where the coordinator agent needs to interact with another agent. These interactions can be transparent to the user account, unless the user account requests to see them as described herein.

It is possible that a given workspace might have a lot of channels and a lot of members, and in such case, the workspace could be very active and have a high volume of messages. This possibly can cause concern that the autonomous agents in the workspace might utilize more system resources than desired. In some embodiments, each message that is sent to the task agents and coordinator agents needs to be processed by those agents. Some of these agents are instances of very large artificial intelligence tools and consume significant computing resources and real-world costs to process prompts. Accordingly, it can be desirable to limit messages that are sent to the agents in the workspace. This can be accomplished using member-specific workspace views.

As illustrated in FIG. 6, every member of workspace 602 has a respective workspace view. User account 626 has workspace view that is displayed in front end 172; coordinator agent 614 has workspace view 624; and task agent 616 has workspace view 622.

In some embodiments, a respective workspace view includes messages in channels to which the member belongs, configurations for the channels, and members of the channels. The workspace view may also include names and members (agents and user accounts) of other channels in the workspace to which the member does not belong.

Workspace manager 606 is responsible for providing an interface between members of workspace 602 and workspace 602. One responsibility of workspace manager 606 is to send the respective workspace to the respective workspace member, and to send updates to the respective workspace view to the workspace member. For example, when task agent 616 joins the workspace or a channel within the workspace, workspace manager 606 can send workspace view 622 to task agent 616. Workspace view 622 is a filtered view of workspace 602 that is filtered to only include information about the configuration of workspace 602 and messages in channels 610 that task agent 616 has joined.

As new messages are posted in channels 610 of workspace 602, workspace manager 606 can send updates to workspace view 622 for task agent 616 (as well as respective workspace views for other members of workspace 602) so that task agent 616 can make a determination on how it should respond to those updates.

In some embodiments, workspace manager 606 can stream a filtered set of the workspace 602 to each agent. In some embodiments, workspace manager 606 can send an up-to-date view of the workspace when an event occurs. The distinction between these two options is that the workspace view contains a list of operation transforms that the agents can use to derive the updated workspace view, or the workspace manager 606 can process the operation transforms before sending the workspace view. Another option is that agents can request updates to the workspace view through an API. These options are not mutually exclusive and can exist together for use in particular circumstances.

In some embodiments, a member of workspace 602 can request to have updates to their workspace view suppressed for a period of time. For example, if a first task agent is in a channel with many other task agents, the first task agent might be able to determine that it is unlikely there will be a message for it to respond to for a period, and can request to not receive updated messages until the expiration of that period. In this way, the first task agent can avoid having to process new messages in the channel during the period in which it does not expect to receive a message that would require a response from the first task agent.

In some embodiments, workspace manager 606 can determine that the volume of messages in channel 610 is above a threshold, and can delay transmission of updates to workspace view 622 to reduce a burden on agents in channel 610 in having to process messages at such a high rate.

In some embodiments, workspace manager 606 or an agent in channel 610 can determine that a given task to be performed is not a high priority. In such embodiments, workspace manager 606 can write a configuration update to workspace 602 to indicate that processing of the task will be scheduled for a time when computing resources are more economical (such as at night when less requests need to be processed). In this way, workspace manager 606 can record a quality of service parameter into the workspace. The quality of service parameter can be determined by workspace manager 606 or an agent in the workspace.

As addressed above, workspace manager 606 is an interface to workspace 602. As such, workspace manager 606 also receives messages from members and posts those messages to workspace 602. Generally, members can join/leave workspace, create/delete channel, join/leave/invite to channel, send message, spawn/kill/die process, and yield. To take any of these actions, a member of the workspace 602 can send a message to workspace manager 606 and workspace manager 606 will post the messages as instructed. However, in some embodiments, workspace 602 might include a configuration that might limit the general set of actions a member can take. For example, if a channel in workspace 602 includes a task agent that has access to a confidential knowledge set, workspace 602 might include a configuration that limits the ability of some members (such as other task agents) from joining or reading messages in the channel.

In some embodiments, members of workspace 602 can request messages posted in a channel to which it is not a member. For example, task agent 616 might request the content of the main channel even though it is not a member of the main channel so that task agent 616 might better understand the state of workspace 602 and understand why it was invoked into another channel in workspace 602. Workspace manager 606 can respond to such requests and provide information about channels that task agent 616 is not a member of, but workspace manager 606 generally will not proactively send updates about messages posted in channels to which task agent 616 is not a member.

Since workspace manager 606 is an interface to workspace 602, workspace manager 606 can also enforce policies of workspace 602. For example, a default policy might be that task agent 616 can not post in a main channel, and therefore workspace 602 can refuse to post messages from task agent 616 into the main channel.

In another example, while most channels in a workspace are generally readable by any member of the workspace, it can be possible for a task agent to create a private channel by providing an operation transform configuring the created channel as having limited access or limiting which agents or user accounts can read from the created channel. Such flexibility in configurations of workspace 602 open up a paradigm whereby task agents that have access to confidential information can be brought into a workspace and avoid disseminating confidential information beyond user accounts or agents with rights to access the confidential information. In some embodiments, it is possible that coordinator agent 614 might not even have access to such information and a channel might need to be created that excludes access by coordinator agent 614.

The above policies are provided for example only. The present technology permits coordinator agent 614 or task agents 616 from expressing a policy as an operation transforms to configure workspace 602 or a channel thereof, and workspace manager 606 can enforce the policy.

In some embodiments, messages included in the workspace are written in the form of operation transforms. While the interfaces shown in FIG. 3 show a message space-like interface with natural language messages, this is for illustration only. Workspace 602 records messages in the form of computer code, which includes less ambiguity. Each message is an operation transform that specifies how the message is modifying workspace 602. In some embodiments, workspace 602 is an append-only ledger. Some of the operation transforms might simply post a message to channel 610, or they might even edit a configuration or other message in workspace 602, but such edits are done through posting an additional operation transform making such an edit. This can have the benefit that any agent reviewing the workspace or their respective workspace view can have full context on the current state of the workspace.

In some embodiments, one or more members of a workspace, especially one of the agents might desire a place to record notes and can create scratchpad 612. Scratchpad 612 is a channel for note taking, and can be especially useful when a task given to an agent is a multi-part task or long-running task. Some artificial intelligence tools have a limited context window or can only process a limited number of tokens at once. As such, it can be helpful to break some tasks into parts and use scratchpad 612 to keep track of steps in the task and intermediate results from sub-steps. Scratchpad 612 can be a workspace for the coordinator agent 614 to keep track of a sequence of tasks in a long-running task and to record intermediate responses along the way to completing the long-running task.

As the system illustrated in FIG. 6 supports a protocol, and method by which artificial intelligence agents can interact, the system can also benefit from creating training data database 630 to be used in the ongoing training of the machine learning algorithms that underlie the agents that will interact using workspace 602.

Accordingly, the system illustrated in FIG. 6 can include trace service 604, which is configured to perform event traces to create a data flow graph associated with a particular agent (coordinator agent or task agent) decision event. The data flow graph identifies related decision events leading up to and after the particular agent decision event, wherein the data flow graph can record which functions were called, with which arguments, at what time, as well as other key relationships between functions (e.g., which functions called another, how did the data flow, which function results were visible to other concurrent agents), etc. In some embodiments, trace service 604 can perform a similar function to a malware graphing service that tracks behaviors of an algorithm, but in this case, trace service 604 is tracking events leading up to a decision or output from an agent (e.g., coordinator agent 614 or task agents 616).

Review of actions service 608 is an algorithm or artificial intelligence tool that is configured to score the quality of an outcome such as a decision or output from an agent. For example, trace service 604 can record a decision by coordinator agent 614 to invoke a particular task agent to perform a task requested by user account 626, and trace that decision to a conclusion that responds to the task requested by user account 626. If review of actions service 608 determines that a quality response was provided to user user account 626, review of actions service 608 can grade the ultimate outcome and the decision to invoke the particular agent highly, but if the user account 626 needed to request an improvement in the response, review of actions service 608 might provide a lower grade. Collectively this data (the data flow graph and decision score) can be stored as training data database 630.

Training data database 630 can be used to further train any of the agents involved in the task. Following the example above, training data database 630 can be used to reinforce good decisions by coordinator agent 614 to select a task agent that is well suited to perform the task and to discourage decisions that did not lead to a quality outcome.

Training data database 630 can be used with any suitable training technique. In some embodiments, a preferred training technique can be a reinforcement learning process whereby coordinator agent 614 is influenced to introduce some variance in its decision-making process to explore unknown decisions (such as to try out new task agents) to learn when improved task agents become available.

Figure 7:
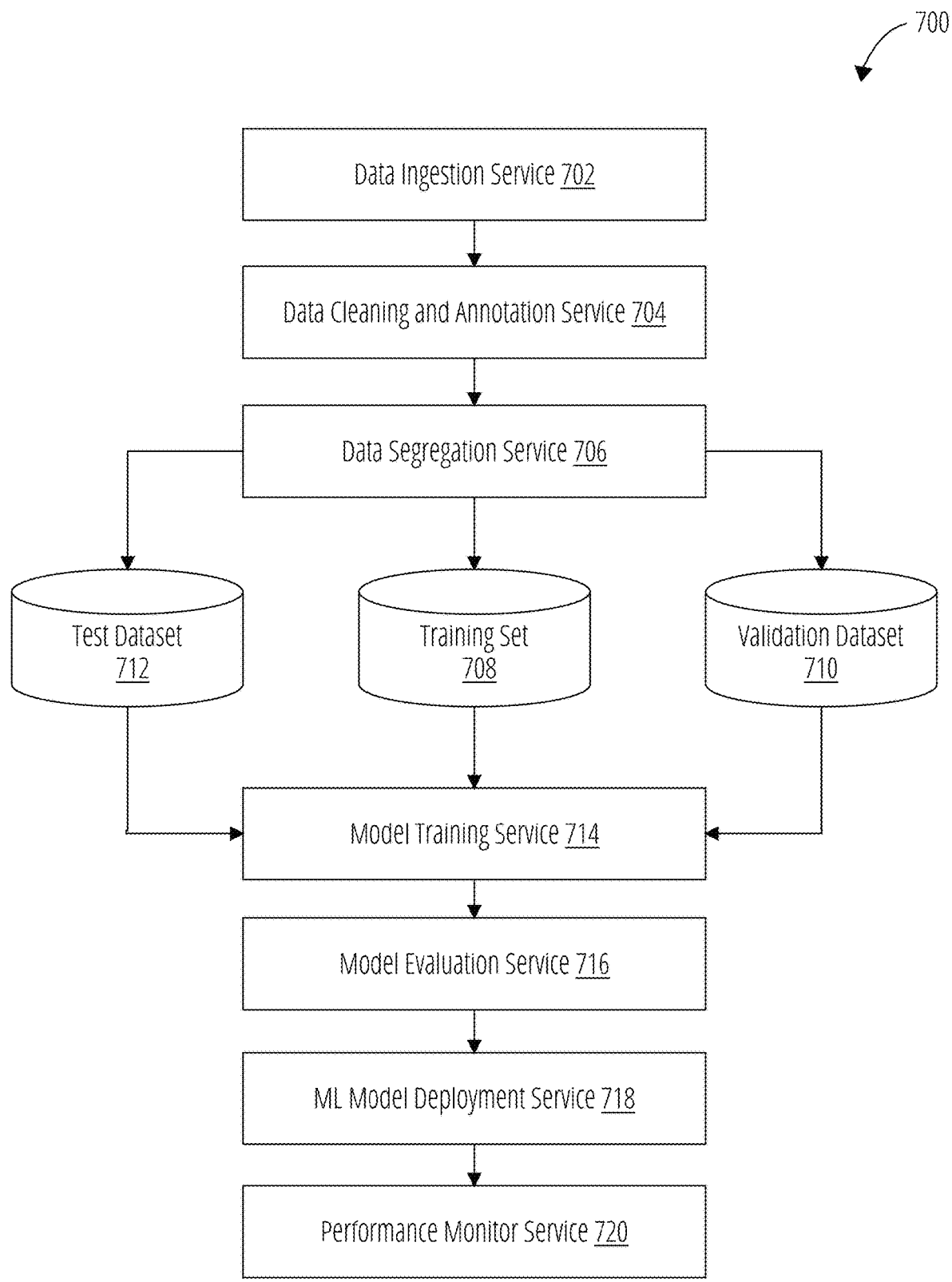
FIG. 7 illustrates an example lifecycle of an ML model in accordance with some embodiments of the present technology.
Figure 8:
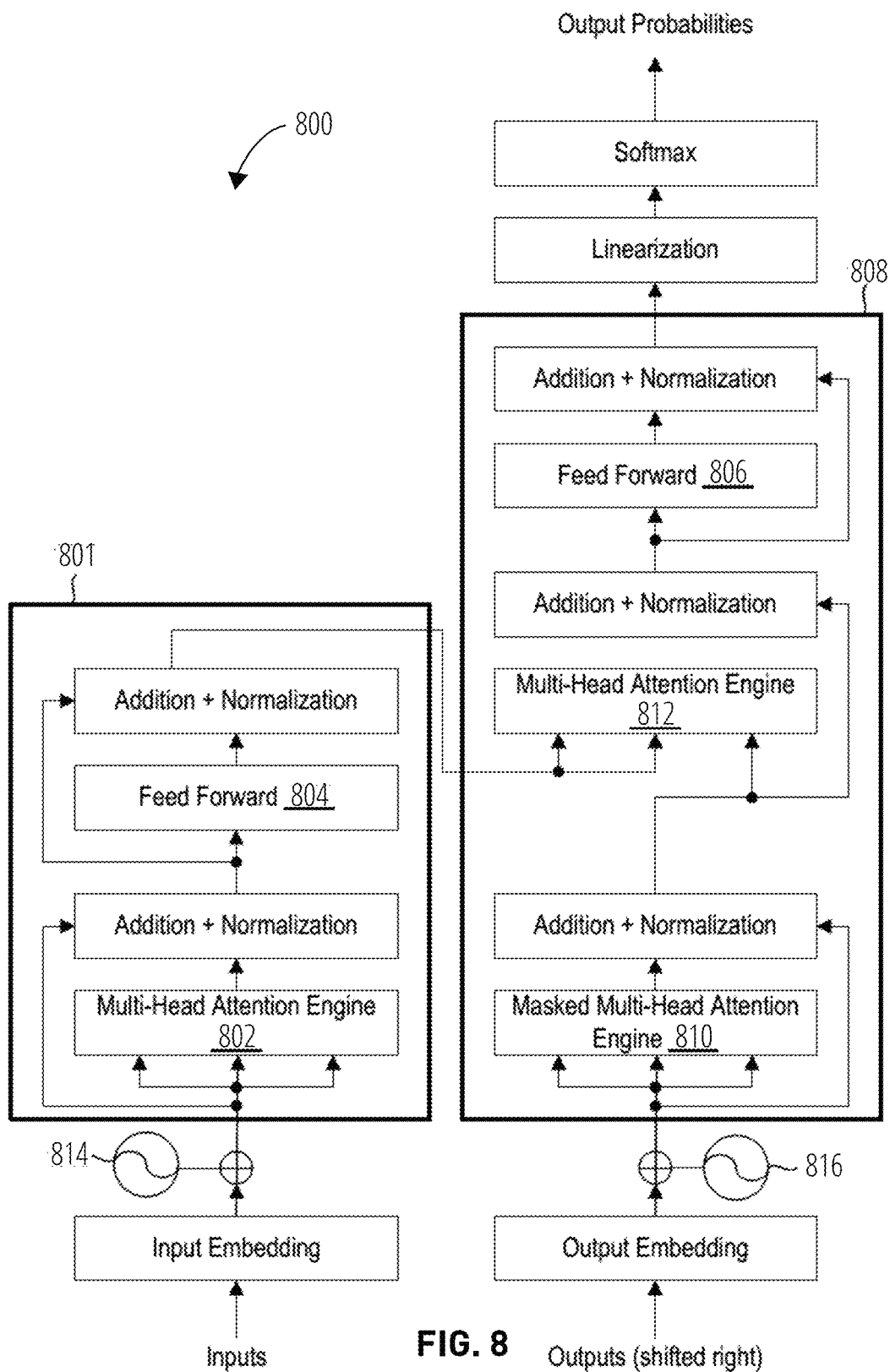
FIG. 8 is a block diagram of an example transformer in accordance with some aspects of the disclosure.

FIG. 7 illustrates an example lifecycle of a ML model in accordance with some embodiments of the present technology. The first stage of the lifecycle 700 of a ML model is a data ingestion service 702 to generate datasets described below. ML models require a significant amount of data for the various processes described in FIG. 7 and the data persisted without undertaking any transformation to have an immutable record of the original dataset. The data can be provided from third party sources such as publicly available dedicated datasets. The data ingestion service 702 provides a service that allows for efficient querying and end-to-end data lineage and traceability based on a dedicated pipeline for each dataset, data partitioning to take advantage of the multiple servers or cores, and spreading the data across multiple pipelines to reduce the overall time to reduce data retrieval functions.

In some cases, the data may be retrieved offline that decouples the producer of the data from the consumer of the data (e.g., an ML model training pipeline). For offline data production, when source data is available from the producer, the producer publishes a message and the data ingestion service 702 retrieves the data. In some examples, the data ingestion service 702 may be online and the data is streamed from the producer in real-time for storage in the data ingestion service 702.

After data ingestion service 702, a data preprocessing service preprocesses the data to prepare the data for use in the lifecycle 700 and includes at least data cleaning, data transformation, and data selection operations. The data cleaning and annotation service 704 removes irrelevant data (data cleaning) and general preprocessing to transform the data into a usable form. The data cleaning and annotation service 704 includes labelling of features relevant to the ML model. In some examples, the data cleaning and annotation service 704 may be a semi-supervised process performed by a ML to clean and annotate data that is complemented with manual operations such as labeling of error scenarios, identification of untrained features, etc.

After the data cleaning and annotation service 704, data segregation service 706 to separate data into at least a training set 708, a validation dataset 710, and a test dataset 712. Each of the training set 708, a validation dataset 710, and a test dataset 712 are distinct and do not include any common data to ensure that evaluation of the ML model is isolated from the training of the ML model.

The training set 708 is provided to a model training service 714 that uses a supervisor to perform the training, or the initial fitting of parameters (e.g., weights of connections between neurons in artificial neural networks) of the ML model. The model training service 714 trains the ML model based a gradient descent or stochastic gradient descent to fit the ML model based on an input vector (or scalar) and a corresponding output vector (or scalar).

After training, the ML model is evaluated at a model evaluation service 716 using data from the validation dataset 710 and different evaluators to tune the hyperparameters of the ML model. The predictive performance of the ML model is evaluated based on predictions on the validation dataset 710 and iteratively tunes the hyperparameters based on the different evaluators until a best fit for the ML model is identified. After the best fit is identified, the test dataset 712, or holdout data set, is used as a final check to perform an unbiased measurement on the performance of the final ML model by the model evaluation service 716. In some cases, the final dataset that is used for the final unbiased measurement can be referred to as the validation dataset and the dataset used for hyperparameter tuning can be referred to as the test dataset.

After the ML model has been evaluated by the model evaluation service 716, an ML model deployment service 718 can deploy the ML model into an application or a suitable device. The deployment can be into a further test environment such as a simulation environment, or into another controlled environment to further test the ML model.

After deployment by the ML model deployment service 718, a performance monitor service 720 monitors for performance of the ML model. In some cases, the performance monitor service 720 can also record additional transaction data that can be ingested via the data ingestion service 702 to provide further data, additional scenarios, and further enhance the training of ML models.

In a convolutional neural network (CNN) model, the number of operations required to relate signals from two arbitrary input or output positions grows in the distance between positions, which makes learning dependencies at different distant positions challenging for a CNN model. Transformer 800 reduces the operations of learning dependencies by using encoder 801 and decoder 808 that implements an attention mechanism at different positions of a single sequence to compute a representation of that sequence. An attention function can be described as mapping a query and a set of key-value pairs to an output, where the query, keys, values, and output are all vectors. The output is computed as a weighted sum of the values, where the weight assigned to each value is computed by a compatibility function of the query with the corresponding key.

In one example of a transformer, encoder 801 is composed of a stack of six identical layers and each layer has two sub-layers. The first sub-layer is multi-head self-attention engine 802, and the second sub-layer is a fully connected feed-forward network 804. A residual connection (not shown) connects around each of the sub-layers followed by normalization.

In this example of Transformer 800, decoder 808 is also composed of a stack of six 6 identical layers. The decoder also includes masked multi-head self-attention engine 810, multi-head attention engine 812 over the output of encoder 801, and fully connected feed-forward network 806. Each layer includes a residual connection (not shown) around the layer, which is followed by layer normalization. Masked multi-head self-attention engine 810 is masked to prevent positions from attending to subsequent positions and ensures that the predictions at position i can depend only on the known outputs at positions less than i (e.g., auto-regression).

In the transformer, the queries, keys, and values are linearly projected by a multi-head attention engine into learned linear projects, and then attention is performed in parallel on each of the learned linear projects, which are concatenated and then projected into final values.

The transformer also includes positional encoder 814 to encode positions because the model does not contain recurrence and convolution and relative or absolute position of the tokens is needed. In Transformer 800, the positional encodings are added to the input embeddings at the bottom layer of encoder 801 and decoder 808. The positional encodings are summed with the embeddings because the positional encodings and embeddings have the same dimensions. A corresponding position decoder 816 is configured to decode the positions of the embeddings for decoder 808.

In some aspects, Transformer 800 uses self-attention mechanisms to selectively weigh the importance of different parts of an input sequence during processing and allows the model to attend to different parts of the input sequence while generating the output. The input sequence is first embedded into vectors and then passed through multiple layers of self-attention and feed-forward networks. Transformer 800 can process input sequences of variable length, making it well-suited for natural language processing tasks where input lengths can vary greatly. Additionally, the self-attention mechanism allows Transformer 800 to capture long-range dependencies between words in the input sequence, which is difficult for RNNs and CNNs. The transformer with self-attention has achieved results in several natural language processing tasks that are beyond the capabilities of other neural networks and has become a popular choice for language and text applications. For example, the various large language models, such as a generative pretrained transformer (e.g., ChatGPT, etc.) and other current models are types of transformer networks.

Figure 9:
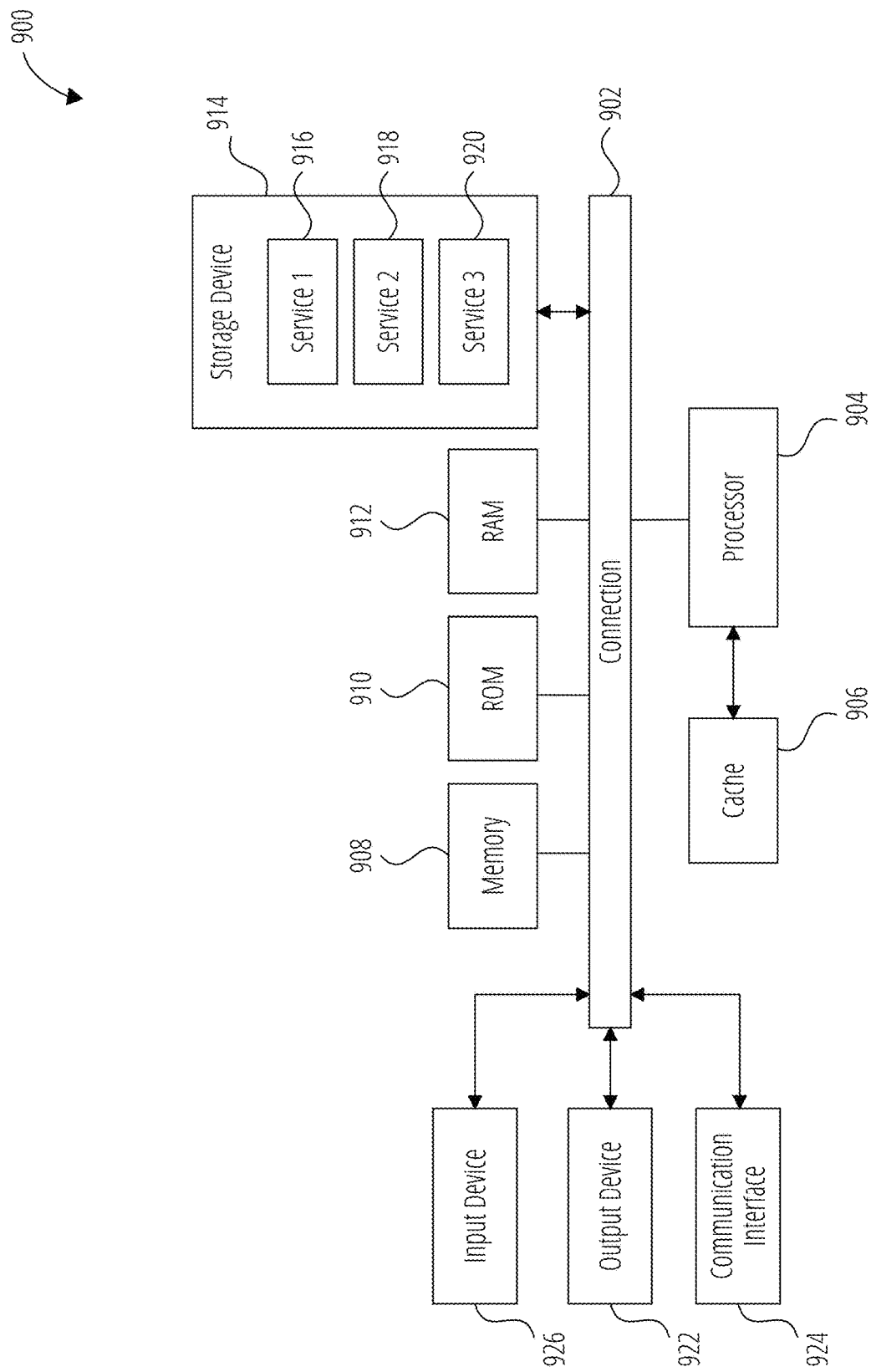
FIG. 9 shows an example of a system for implementing some embodiments of the present technology.

FIG. 9 shows an example of computing system 900, which can be for example any computing device in which the components of the system are in communication with each other using connection 902. Connection 902 can be a physical connection via a bus, or a direct connection into processor 904, such as in a chipset architecture. Connection 902 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example computing system 900 includes at least one processing unit (CPU or processor) 904 and connection 902 that couples various system components including system memory 908, such as read-only memory (ROM) 910 and random access memory (RAM) 912 to processor 904. Computing system 900 can include a cache of high-speed memory 906 connected directly with, in close proximity to, or integrated as part of processor 904.

Processor 904 can include any general purpose processor and a hardware service or software service, such as services 916, 918, and 920 stored in storage device 914, configured to control processor 904 as well as a special-purpose processor where software instructions are incorporated into the actual processor design. Processor 904 may essentially be a completely self-contained computing system, containing multiple cores or processors, a bus, memory controller, cache, etc. A multi-core processor may be symmetric or asymmetric.

To enable user interaction, computing system 900 includes an input device 926, which can represent any number of input mechanisms, such as a microphone for speech, a touch-sensitive screen for gesture or graphical input, keyboard, mouse, motion input, speech, etc. Computing system 900 can also include output device 922, which can be one or more of a number of output mechanisms known to those of skill in the art. In some instances, multimodal systems can enable a user to provide multiple types of input/output to communicate with computing system 900. Computing system 900 can include communication interface 924, which can generally govern and manage the user input and system output. There is no restriction on operating on any particular hardware arrangement, and therefore the basic features here may easily be substituted for improved hardware or firmware arrangements as they are developed.

Storage device 914 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read-only memory (ROM), and/or some combination of these devices.

The storage device 914 can include software services, servers, services, etc., that when the code that defines such software is executed by the processor 904, it causes the system to perform a function. In some embodiments, a hardware service that performs a particular function can include the software component stored in a computer-readable medium in connection with the necessary hardware components, such as processor 904, connection 902, output device 922, etc., to carry out the function.

For clarity of explanation, in some instances, the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer-readable media. Such instructions can comprise, for example, instructions and data which cause or otherwise configure a general purpose computer, special purpose computer, or special purpose processing device to perform a certain function or group of functions. Portions of computer resources used can be accessible over a network. The executable computer instructions may be, for example, binaries, intermediate format instructions such as assembly language, firmware, or source code. Examples of computer-readable media that may be used to store instructions, information used, and/or information created during methods according to described examples include magnetic or optical disks, solid-state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smartphones, small form factor personal computers, personal digital assistants, and so on. The functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

ASPECTS

The present technology includes computer-readable storage mediums for storing instructions, and systems for executing any one of the methods embodied in the instructions addressed in the aspects of the present technology presented below:

Aspect 1. A method for interacting with a generative response engine while the generative response engine is concurrently performing a task, the method comprising: receiving a second prompt from a prompt source with the generative response engine through a front-end interface while a generative response engine is concurrently performing a task that resulted from a first prompt received in the front-end interface.

Aspect 2. The method of Aspect 1, wherein the second prompt pertains to the task that is concurrently being performed, for example the prompt can define a subtask associated with the task that is concurrently being performed, the prompt can revise the task that is concurrently being performed, the prompt can respond to an intermediate response from the generative response engine.

Aspect 3. The method of any one of Aspects 1-2, further comprising: presenting an intermediate response from the generative response engine in the front-end interface, wherein the intermediate response requests further input from the prompt source, wherein a prompt source can be a human, a virtual assistant, or a second instance of the generative response engine.

Aspect 4. The method of any one of Aspects 1-3, further comprising: determining by the generative response engine to provide the intermediate response, wherein the generative response engine is trained to provide the intermediate response when: the generative response engine determines a blocking detail is unknown, wherein the intermediate response requests input to resolve the blocking detail, the generative response engine determines that a quality score for a possible response is insufficient, wherein the intermediate response requests additional information to generate an answer with a higher quality score; the generative response engine has determined that a period has elapsed without achieving a milestone, wherein the intermediate response is expected to aid the generative response engine in achieving the milestone.

Aspect 5. The method of any one of Aspects 1-4, further comprising: after receiving the first prompt, generating a sequence of tasks, wherein the generative response engine is trained to generate the sequence of tasks.

Aspect 6. The method of any one of Aspects 1-5, further comprising: as part of the generating the sequence of tasks, identifying respective tasks in the sequence of tasks as a blocking task or a non-blocking task.

Aspect 7. The method of any one of Aspects 1-6, further comprising: evaluating a task in the sequence of tasks to label the task as task that should trigger an intermediate response to solicit clarification or further input.

Aspect 8. The method of any one of Aspects 1-7, wherein the sequence of tasks is represented in a tree structure or program code.

Aspect 9. The method of any one of Aspects 1-8, further comprising: storing the sequence of tasks in a notepad along with generated responses associated with the task in the sequence of tasks.

Aspect 10. The method of any one of Aspects 1-9, wherein the quality score being insufficient is relative to a task type.

Aspect 11. The method of any one of Aspects 1-10, further comprising: presenting an estimated time of completion, wherein the generative response engine is trained to predict how long the task will take to complete.

Aspect 12. The method of any one of Aspects 1-11, further comprising: receiving a query regarding progress made by the generative response engine; and providing a response to the query regarding the progress made.

Aspect 13. The method of any one of Aspects 1-12, wherein the first prompt provides an indication of a priority of the task, wherein the generative response engine utilizes the priority to request processing resources and scheduling.

What is claimed is:

1. A method comprising:
receiving a first prompt by a generative response engine through a front-end interface, from a prompt source, to perform a task, wherein the first prompt begins a conversational thread related to the task;
initiating performance of the task in response to the first prompt, wherein the generative response engine is configured to predict a sequence of tokens by sampling from a probability distribution of possible tokens;
receiving a second prompt by the generative response engine, from the prompt source, while the generative response engine is concurrently performing the task that resulted from the first prompt received in the front-end interface, wherein the second prompt refers to the task that is concurrently being performed; and
generating a response to the second prompt while the generative response engine is concurrently performing the task that resulted from the first prompt, wherein the generating of the response to the second prompt includes accounting for progress made in the performance of the task in response to the first prompt.

2. The method of claim 1, further comprising:
determining from performing the task, that an intermediate response should be presented in the front-end interface;
presenting the intermediate response from the generative response engine in the front-end interface, wherein the intermediate response requests further input from the prompt source.

3. The method of claim 1, further comprising:
after receiving the first prompt, generating a sequence of tasks, wherein the generative response engine is trained to generate the sequence of tasks.

4. The method of claim 3, further comprising:
as part of the generating the sequence of tasks, identifying respective tasks in the sequence of tasks as a blocking task or a non-blocking task.

5. The method of claim 3, further comprising:
storing the sequence of tasks in a notepad along with generated responses associated with the task in the sequence of tasks.

6. The method of claim 1, further comprising:
presenting an estimated time of completion, wherein the generative response engine is trained to predict how long the task will take to complete.

7. The method of claim 1, further comprising:
receiving a query regarding progress made by the generative response engine; and
providing a response to the query regarding the progress made in performing the task in response to the first prompt.

8. A non-transitory computer-readable storage medium, the non-transitory computer-readable storage medium including instructions that when executed by a computer, cause at least one processor to:
receive a first prompt by a generative response engine through a front-end interface, from a prompt source, to perform a task, wherein the first prompt begins a conversational thread related to the task, wherein the generative response is configured to predict a sequence of tokens by sampling from a probability distribution of possible tokens;
receive a second prompt by the generative response engine, from the prompt source, while the generative response engine is concurrently performing the task that resulted from the first prompt received in the front-end interface, wherein the second prompt refers to the task that is concurrently being performed; and
presenting, by the generative response engine, a response to the second prompt while the generative response engine is concurrently performing the task that resulted from the first prompt, wherein the response to the second prompt accounts for progress made in the performance of the task in response to the first prompt.

9. The non-transitory computer-readable storage medium of claim 8, wherein the instructions further configure the at least one processor to:
determining from performing the task, that an intermediate response should be presented in the front-end interface;
present the intermediate response from the generative response engine in the front-end interface, wherein the intermediate response requests further input from the prompt source.

10. The non-transitory computer-readable storage medium of claim 8, wherein the instructions further configure the at least one processor to:
after receiving the first prompt, generate a sequence of tasks, wherein the generative response engine is trained to generate the sequence of tasks.

11. The non-transitory computer-readable storage medium of claim 10, wherein the instructions further configure the at least one processor to:
as part of the generating the sequence of tasks, identify respective tasks in the sequence of tasks as a blocking task or a non-blocking task.

12. The non-transitory computer-readable storage medium of claim 10, wherein the instructions further configure the at least one processor to:
store the sequence of tasks in a notepad along with generated responses associated with the task in the sequence of tasks.

13. The non-transitory computer-readable storage medium of claim 8, wherein the instructions further configure the at least one processor to:
present an estimated time of completion, wherein the generative response engine is trained to predict how long the task will take to complete.

14. A computing system comprising:
at least one processor; and
a memory storing instructions that, when executed by the at least one processor, configure the computing system to:
receive a first prompt by a generative response engine through a front-end interface, from a prompt source, to perform a task, wherein the first prompt begins a conversational thread related to the task, wherein the generative response engine is configured to predict a sequence of tokens by sampling from a probability distribution of possible tokens;
receive a second prompt by the generative response engine, from the prompt source, while the generative response engine is concurrently performing the task that resulted from the first prompt received in the front-end interface, wherein the second prompt refers to the task that is concurrently being performed; and
processing a response to the second prompt while the generative response engine is concurrently performing the task that resulted from the first prompt, wherein the processing of the response to the second prompt includes accounting for progress made in the performance of the task in response to the first prompt.

15. The computing system of claim 14, wherein the instructions further configure the computing system to:
determining from performing the task, that an intermediate response should be presented in the front-end interface;
present the intermediate response from the generative response engine in the front-end interface, wherein the intermediate response requests further input from the prompt source.

16. The computing system of claim 14, wherein the instructions further configure the computing system to:
after receiving the first prompt, generate a sequence of tasks, wherein the generative response engine is trained to generate the sequence of tasks.

17. The computing system of claim 16, wherein the instructions further configure the computing system to:
store the sequence of tasks in a notepad along with generated responses associated with the task in the sequence of tasks.

18. The method of claim 1 wherein the generative response engine is a generative pre-trained transformer.

* * * * *